(12) United States Patent
Deb

(10) Patent No.: US 9,975,773 B2
(45) Date of Patent: May 22, 2018

(54) CARBON AEROGEL

(71) Applicant: UNIVERSITY OF CALCUTTA, West Bengal (IN)

(72) Inventor: Nilanjan Deb, Kolkata (IN)

(73) Assignee: University of Calcutta, West Bengal (IN)

( * ) Notice: Subject to any disclaimer, the term of this patent is extended or adjusted under 35 U.S.C. 154(b) by 524 days.

(21) Appl. No.: 14/547,311

(22) Filed: Nov. 19, 2014

(65) Prior Publication Data

US 2015/0140305 A1    May 21, 2015

(30) Foreign Application Priority Data

Nov. 19, 2013    (IN) ........................... 1311/KOL/2013

(51) Int. Cl.
*C01B 31/02*        (2006.01)

(52) U.S. Cl.
CPC ............. *C01B 31/02* (2013.01); *Y02P 20/136* (2015.11)

(58) Field of Classification Search
CPC ...................................................... C01B 31/02
See application file for complete search history.

(56) References Cited

U.S. PATENT DOCUMENTS

| | | |
|---|---|---|
| 5,260,855 A | 11/1993 | Kaschmitter et al. |
| 5,425,858 A | 6/1995 | Farmer |
| 7,541,312 B2 | 6/2009 | Dietz et al. |

FOREIGN PATENT DOCUMENTS

| | | |
|---|---|---|
| EP | 1481572 A | 12/2004 |
| EP | 1929087 A2 | 6/2008 |
| EP | 2297383 A1 | 3/2011 |
| WO | WO 03/067931 A1 | 8/2003 |
| WO | WO2007/149109 A2 | 12/2007 |
| WO | WO2009/155414 A1 | 12/2009 |
| WO | WO2012/150157 A1 | 11/2012 |

OTHER PUBLICATIONS

Fairén-Jiménez et al., Porosity and surface area of monolithic carbon aerogels prepared using alkaline carbonates and organic acids as polymerization catalysts, *Carbon* (Mar. 31, 2006), 44(11):2301-2307.
Fairén-Jiménez et al., Surface Area and Microporosity of Carbon Aerogels from Gas Adsorption and Small- and Wide-Angle X-ray Scattering Measurements, *J. Phys. Chem. B* (Apr. 7, 2006), 110:8681-8688.
Farmer et al., Electrosorption of Chromium Ions on Carbon Aerogel Electrodes as a Means of Remediating Ground Water, *American Chemical Society, ACS Energy & Fuel* (Dec. 16, 1996), 11(2):337-347.
Farmer et al., Electrochemical and photochemical treatment of aqueous waste streams, Spectrum 96, Nucl. Haz. Waste Mgmt. Intl. Topical, Seattle, Washington, (Aug. 18-23, 1996), 1:435-440.
Farmer et al., The Use of Capacitive Deionization with Carbon Aerogel Electrodes to Remove Inorganic Contaminants from Water, Proc. 1995 Intl. Low-Level Conf., Orlando, Florida, Electric Power Research Institute, Palo Alto, CA, Rept. TR-105569, (Jul. 10-12, 1995), pp. 1-28.
Fu et al., Fabrication of activated carbon fibers/carbon aerogels composites by gelation and supercritical drying in isopropanol, *J. Mater. Res.* (Dec. 2003), 18(12):2765-2773.
Fu et al., Studies of the Chemical and Pore Structures of the Carbon Aerogels Synthesized by Gelation and Supercritical Drying in Isopropanol, *Journal of Applied Polymer Science* (Mar. 5, 2004), 91(5):3060-3067.
Global Market for Aerogels Worth $646.3 Million in 2013, accessed at http://web.archive.org/web/20131013182426/http://www.bccresearch.com/pressroom/avm/global-market-aerogels-worth-$646.3-million-2013, posted on Apr. 3, 2009, pp. 1-2.
Innerlohinger et al., Aerocell Aerogels From Cellulosic Materials, *Lenzinger Berichte* (2006), 86:137-143.
Kubo, Nanostructured Carbohydrate-Derived Carbonaceous Materials, Dissertation zur Erlangung des akademischen Grades "doctor rerum naturalium" (Dr. rer. nat.) in der Wissenschaftsdisziplin "Physikalische Chemie" eingereicht an der Mathematisch-Naturwissenschaftlichen Fakultät der Universität Potsdam Potsdam, pp. 1-140 (2011).
Li et al., Studies on preparation and performances of carbon aerogel electrodes for the application of supercapacitor, *Journal of Power Sources* (Nov. 29, 2005), 158(1):784-788.
New carbon nanotube aerogel with cheap materials, accessed at http://web.archive.org/web/20130307092656/http://www.materialsviews.com/new-carbon-nanotube-aerogel-with-cheap-materials/?, published on Mar. 1, 2013, pp. 1-6.
Pantea et al., Electrical conductivity of conductive carbon blacks: influence of surface chemistry and topology, *Applied Surface Science* (2003), 217:181-193.
Pekala et al., Structure of organic aerogels. 1. Morphology and scaling, *Macromolecules* (1993), 26(20):5487-5493.
Shang et al., Easy synthesis of carbon nanotubes with polypyrrole nanotubes as the carbon precursor, *Polymer* (May 3, 2009), 50(13):2815-2818.
Shariff et al., Some Studies on the Synthesis and Characterization of Carbon Aerogel, *Trans. Ind. Ceram. Soc.* (Apr.-Jun. 2010), vol. 69, No. 2, pp. 1-4 (2010).
Tran et al., Electrosorption on carbon aerogel electrodes as a means of treating low-level radioactive wastes and remediating contaminated ground water, ICEM '97: Six international conference on radioactive waste management and environmental remediation, Singapore, pp. 1-17 (Oct. 12-16, 1997).

(Continued)

*Primary Examiner* — Stuart Hendrickson

(57) ABSTRACT

Methods and compositions for making carbon aerogels from biomass are disclosed. In one embodiment, a method of making a carbon aerogel from a biomass involves dielectrically heating a biomass slurry to produce the carbon aerogel. The method further includes heating the carbon aerogel to produce an electrically conducting carbon aerogel.

10 Claims, 4 Drawing Sheets

(56) References Cited

OTHER PUBLICATIONS

Tsioptsias et al., Chitin and carbon aerogels from chitin alcogels, *Carbohydrate Polymers* (Nov. 21, 2008), 76(4):535-540.
Wang et al., Pyrolysis temperature and time dependence of electrical conductivity evolution for electrostatically generated carbon nanofibers, *IEEE Transactions on Nanotechnology* (Mar. 1, 2003), 2(1):39-43.
Wang et al., Electrical Transport Properties of Carbon Aerogels, *Journal of Porous Materials* (2001), 8(2):167-170.
X-ray diffraction on carbon nanostructures, accessed at http://web.archive.org/web/20130318053529/http://vo.nfi.kiae.ru/drupal/?q=x-ray, accessed on Oct. 24, 2014, pp. 1-5.

CARBON AEROGEL

CROSS-REFERENCE TO RELATED APPLICATION

This application claims priority benefit under Title 35 U.S.C. § 119(a) of Indian Patent Application No. 1311/KOL/2013, filed on Nov. 19, 2013, entitled "Carbon Aerogel", the contents of which are herein incorporated by reference.

BACKGROUND

Carbon aerogels are porous materials with high porosity. Due to their high electrical conductivity and large specific surface area, carbon aerogels may be used in high-performance electrode materials, energy storage devices, harmful substance adsorbents, capacitive deionization-based water purification processes, seawater desalination processes, ion exchange-based waste water treatment processes, and the like. Such carbon aerogels may be obtained from heat treatment of organic aerogels. In general, starting materials for preparing the organic aerogels include resorcinol-formaldehyde, polyacrylonitrile (PAN) and polyurethane (PU). In the case of most existing organic aerogels, an adequate amount of catalyst is added to aqueous solution of the above organic materials, followed by heating, to form the gels over a period of several days or more. Further, the gels obtained from the above method are subjected to supercritical drying, and thus require an additional step of substituting the solvent in the gels with another solvent, such as acetone, suitable for supercritical drying using carbon dioxide. However, these processes are expensive, energy and time consuming, and also needs sophisticated instruments. Thus, simple and energy efficient methods to prepare carbon aerogels, especially from available biomaterials, are desired.

SUMMARY

Disclosed herein are compositions and methods for making carbon aerogels from biomass. In one embodiment, a method of making a carbon aerogel from a biomass involves dielectrically heating a biomass slurry to produce the carbon aerogel. The method further includes heating the carbon aerogel to produce an electrically conducting carbon aerogel.

In another embodiment, a method of making a carbon aerogel having a density of about 0.05 gram/cubic centimeter to about 0.5 gram/cubic centimeter, and porosity of about 0.5 cubic centimeter/gram to about 5 cubic centimeter/gram involves dielectrically heating a biomass slurry to produce the carbon aerogel.

In an additional embodiment, a carbon aerogel disclosed herein may have a density of about 0.01 gram/cubic centimeter to about 0.5 gram/cubic centimeter, a porosity of about 0.1 cubic centimeter/gram to about 5 cubic centimeter/gram, and a surface area of about 100 m$^2$/gram to about 5000 m$^2$/gram, and wherein the carbon aerogel may include a carbonized biomass.

DETAILED DESCRIPTION

Figure 1:
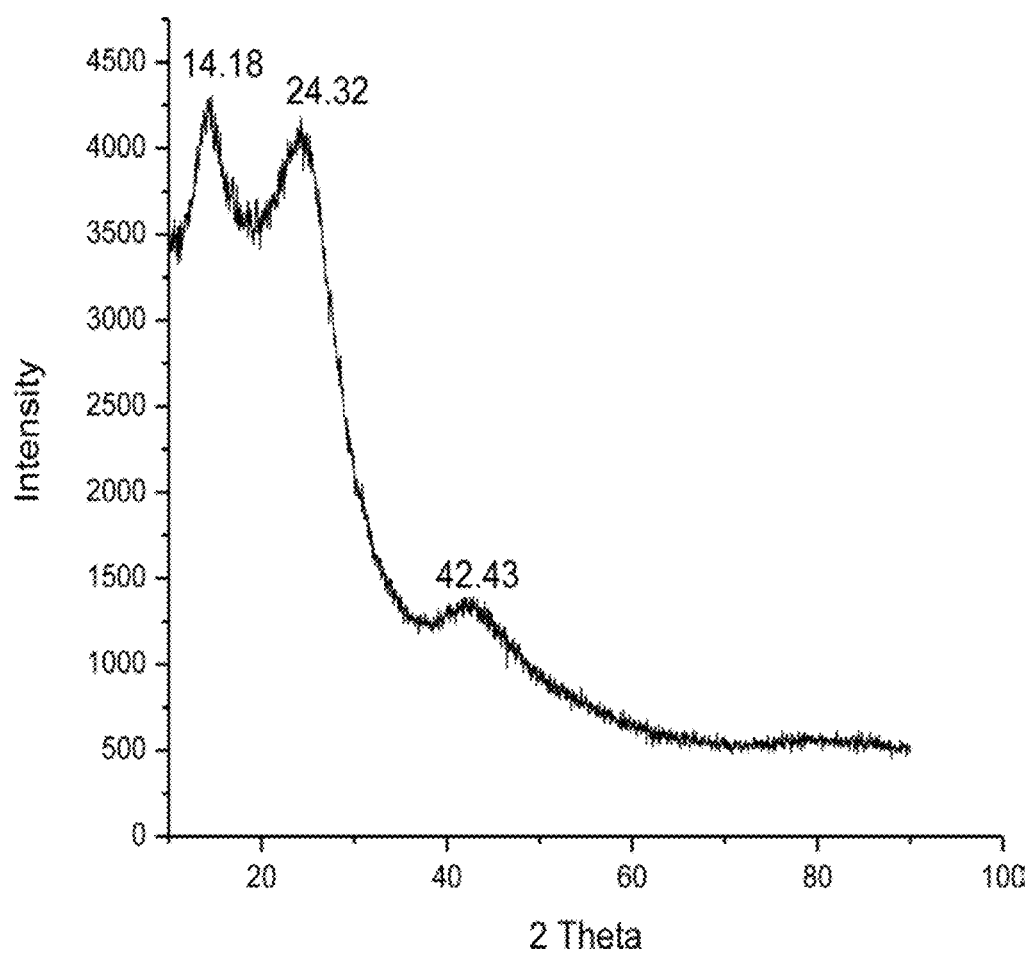
FIG. 1 depicts an X-ray diffraction pattern of a carbon aerogel prepared from wheat flour according to an embodiment.
Figure 2:
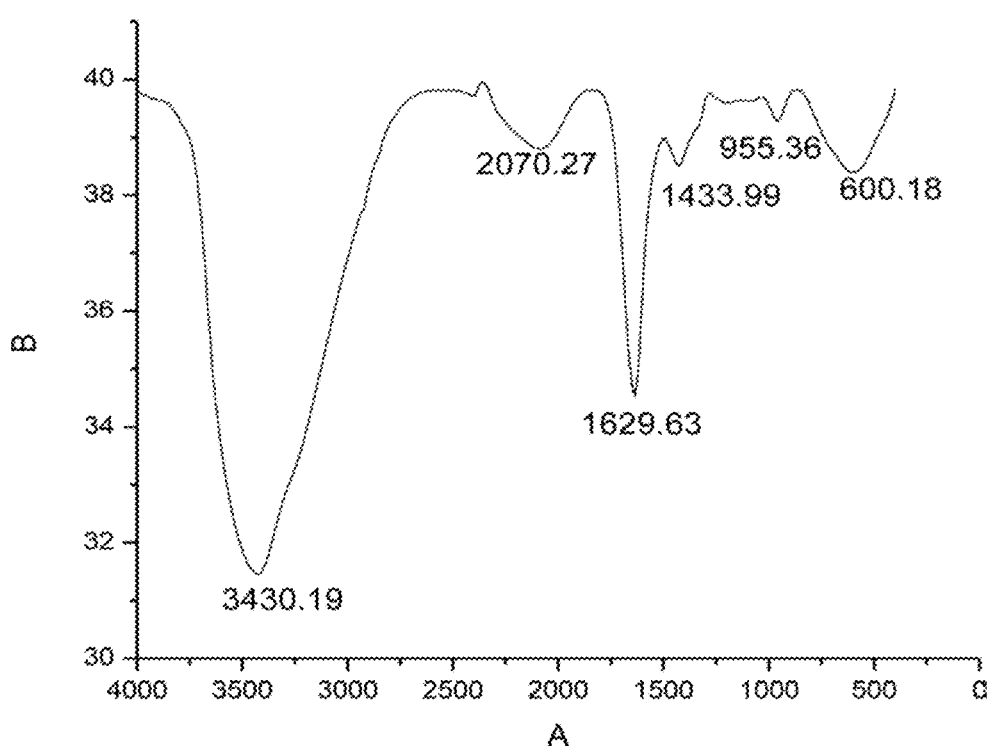
FIG. 2 depicts Fourier transform infrared spectroscopy of a carbon aerogel prepared from wheat flour according to an embodiment. A=wave number (cm$^{-1}$); B=percent transmittance.
Figure 3:
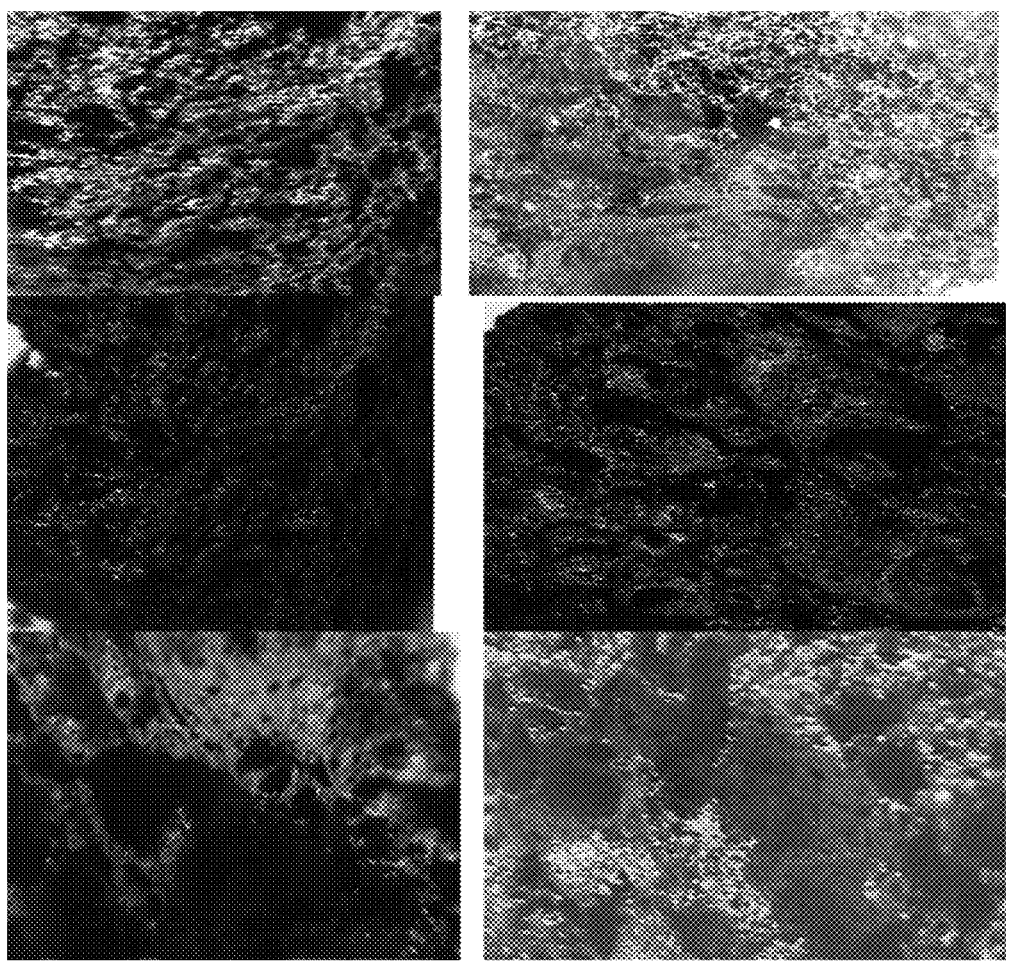
FIG. 3 shows magnified images of surface morphology of various carbon aerogels prepared according to embodiments set forth in Examples 1-7.

Disclosed herein are simple, energy efficient methods to prepare carbon aerogels from biomass. Biomass that may be used in preparing carbon aerogels include, but are not limited to, carbohydrates, gluten, wheat flour, rice flour, baking flour, whole grain flour, oat flour, rye flour, sorghum flour, millet flour, or any combination thereof. In some embodiments, spoilt or non-edible whole wheat flour, or any flour containing good proportion of cellulose and gluten may also be used. Further, any carbohydrate is suitable for use in the current disclosure including, but not limited to, sugars, cellulose, starch, polysaccharides, monosaccharides and oligosaccharides. It should be noted that both soluble carbohydrates, such as starch and sucrose, as well as insoluble carbohydrates, such as cellulose are also applicable in the process disclosed herein.

In some embodiments, methods of making a carbon aerogel from a biomass comprise dielectrically heating the biomass slurry to produce the carbon aerogel. The frequency of the electromagnetic waves used in the dielectric heating may be about 3 KHz to about 300 GHz. For example, the dielectrically heating step may involve heating by a radio frequency energy having a frequency of about 3 KHz to about 300 GHz, about 30 KHz to about 300 GHz, about 75 KHz to about 300 GHz, or about 100 KHz to about 300 GHz. Specific examples include, but are not limited to, about 3 KHz, about 50 KHz, about 100 KHz, about 200 KHz, about 300 KHz, and ranges between any two of these values (including their endpoints). In other embodiments, the dielectrically heating step may involve heating by a microwave energy having a frequency of about 300 MHz to about 300 GHz, about 600 MHz to about 300 GHz, about 1 GHz to about 300 GHz, about 30 GHz to about 300 GHz, or about 100 GHz to about 300 GHz. Specific examples include, but are not limited to, about 300 MHz, about 5 GHz, about 100 GHz, about 200 GHz, about 300 GHz, and ranges between any two of these values (including their endpoints). The dielectric heating may be performed by any device known in the art, such as an oven.

Without being bound by theory, dielectrical heating generates heat due to movement of water molecules in the biomass slurry. The dipole water molecule is sensitive to external electromagnetic field, and will attempt to align with them by rotation. If the field is oscillating, as it is in dielectrical heating, these water molecules rotate continuously aligning with it. Rotating water molecules push, pull, and collide with other molecules (through electrical forces) in the biomass, distributing the energy to adjacent molecules and atoms in the material. Thus, dipole rotation of water molecules provides energy and raises the temperature of the biomass.

Further, electromagnetic radiation can penetrate deep into the biomass material and generate energy that may heat the material uniformly. Microwave heating units can be advantageous in that they are more energy efficient and heat more uniformly than conventional radiant energy or convection ovens and furnaces. The heat developed due to dipole rotation of water molecules is more uniform because the entire mass being heated tends to increase in temperature at a relatively uniform rate. Thus, relatively less disparity exists between externally and internally located portions of the mass of the structure being heated. Such relatively uniform heating, while leading to uniform production of properties within the structure of the heated object, also produces less propensity for thermal cracking. This is due to significantly same temperatures being achieved in different portions of the carbon structure during the heat up.

In some embodiments, the dielectrically heating step may be performed for generally any duration of time, for example, for about 10 seconds to about 60 minutes, about 1 minute to about 60 minutes, about 10 minutes to about 60 minutes, or about 30 minutes to about 60 minutes. Specific examples include, but are not limited to, about 10 seconds, about 1 minute, about 5 minutes, about 10 minutes, about 30 minutes, about 60 minutes, and ranges between any two of these values (including their endpoints).

In some embodiments, the carbon aerogels prepared by the methods disclosed herein may have a porosity of about 0.5 cubic centimeter/gram to about 5 cubic centimeter/gram, about 1 cubic centimeter/gram to about 5 cubic centimeter/gram, about 2.5 cubic centimeter/gram to about 5 cubic centimeter/gram, or about 3 cubic centimeter/gram to about 5 cubic centimeter/gram. Specific examples include, but are not limited to, about 0.5 cubic centimeter/gram, about 1 cubic centimeter/gram, about 2 cubic centimeter/gram, about 3 cubic centimeter/gram, about 5 cubic centimeter/gram and ranges between any two of these values (including their endpoints).

In other embodiments, the carbon aerogels prepared by the methods disclosed herein may have generally any density, such as a density of about 0.05 gram/cubic centimeter to about 0.5 gram/cubic centimeter, about 0.1 gram/cubic centimeter to about 0.5 gram/cubic centimeter, about 0.2 gram/cubic centimeter to about 0.5 gram/cubic centimeter, or about 0.4 gram/cubic centimeter to about 0.5 gram/cubic centimeter. Specific examples include, but are not limited to, about 0.05 gram/cubic centimeter, about 0.1 gram/cubic centimeter, about 0.2 gram/cubic centimeter, about 0.5 gram/cubic centimeter, and ranges between any two of these values (including their endpoints).

In additional embodiments, the carbon aerogels prepared by the methods disclosed herein may have generally any surface area, such as a surface area of about 1000 $m^2$/gram to about 5000 $m^2$/gram, about 2000 $m^2$/gram to about 5000 $m^2$/gram, about 3000 $m^2$/gram to about 5000 $m^2$/gram, or about 4000 $m^2$/gram to about 5000 $m^2$/gram. Specific examples include, but are not limited to, about 1000 $m^2$/gram, about 2500 $m^2$/gram, about 3500 $m^2$/gram, about 5000 $m^2$/gram, and ranges between any two of these values (including their endpoints).

In some embodiments, the carbon aerogels prepared by the methods disclosed herein may have generally any yield strength, such as a yield strength equal to or greater than about 1 MPa, equal to or greater than about 2 MPa, equal to or greater than about 5 MPa, equal to or greater than about 10 MPa, or equal to or greater than about 20 MPa. Specific examples include, but are not limited to, about 1 MPa, about 2 MPa, about 3 MPa, about 5 MPa, about 10 MPa, about 15 MPa, or about 20 MPa, and ranges between any two of these values (including their endpoints).

An example method may be used to make a carbon aerogel prepared from wheat flour slurry. Whole wheat flour is a combination of polysaccharides consisting of starch (72%), fiber (cellulose-12%), and gluten (14%). Polysaccharides are insoluble in water and make suitable precursor materials for carbon aerogel synthesis. Likewise, cellulose, which is also water insoluble, may help impart strength to carbon aerogels. In addition, gluten may impart hardiness to aerogels. Gluten consists of many long, elastic chains of proteins lined along each other, and may possibly provide elastic property and toughness through the development of the gluten network during microwave heating. Glutenin and gliadin molecules in gluten may possibly cross-link to form a sub-microscopic network, which may contribute to the viscosity (thickness) and extensibility to the precursor mixture prior to dielectric heating. Further, the quality of aerogels may depend on the ratio of wheat flour to water, and the dielectric heating time. Whole wheat flour, when mixed with sufficient water to make a homogenous slurry, may yield good carbon aerogels. In contrast, high water content may yield brittle, large pore-containing aerogels.

The carbon aerogels prepared by dielectric heating methods described herein can be generally electrically non-conductive. To make carbon aerogels electrically conducting, the carbon aerogel may be further subjected to conventional heating. This conventional heating can be performed by using any heating device, such as a hot plate, an oven, a heater, a griller, a furnace, hot air, or any combination thereof. In some embodiments, the carbon aerogel may also be subjected to pyrolysis, heating under inert conditions, or any combinations thereof. This conventional heating may be performed for generally any duration of time, such as for about 10 seconds to about 60 minutes, about 1 minute to about 60 minutes, about 10 minutes to about 60 minutes, or about 30 minutes to about 60 minutes. Specific examples include, but are not limited to, about 10 seconds, about 1 minute, about 5 minutes, about 10 minutes, about 30 minutes, about 60 minutes, and ranges between any two of these values (including their endpoints).

In some embodiments, the carbon aerogels, when subjected to conventional heating, may acquire electrical conducting property only on the surface that is exposed to the conventional heating. The remaining surface(s) not exposed to heat may remain electrically non-conductive, and may behave as an insulator. For example, two sides of a cubical shaped carbon aerogel may be heated on a hot plate. This cubical carbon aerogel may display electrical conductance on the two heated surfaces only, and rest of the surfaces may behave as an insulator. Further, electrical conductivity of the surface may be controlled. Heating the carbon aerogel (for example, by conventional heating) for longer periods of time may result in increased electrical conductance, and heating for shorter periods of time may result in decreased electrical conductance. In some embodiments, different surfaces of a single carbon aerogel specimen may be heated for different periods of time, resulting in carbon aerogels having surfaces with different electrical conductance properties.

In some embodiments, the carbon aerogels that are subjected to conventional heating may behave as three-dimensional topological insulators. A topological insulator is a material that behaves as an insulator in its interior while permitting the movement of charges on its boundary or the surface. Conventional heating may induce unidirectional electrical conductivity in the carbon aerogel. The carbon aerogels described herein may be used as topological insulators in, for example, high speed transistors, capacitors, semiconductors, and other electrical devices.

The carbon aerogels described herein can be highly porous, low density, high specific surface area, electrically conductive, heat resistant, and strong. The methods of preparation of carbon aerogel disclosed herein are economical, and the precursor materials are abundantly available, inexpensive, non-toxic, and environmentally benign. Further, the processes do not involve complex steps, such as, for example, solvent exchange or addition of catalysts.

Carbon aerogels described herein can be used as, for example, insulators, 3D topological insulators, heat sinks in electronics, catalyst supports, sieves in filtration devices, scaffolds for composites, catalysts, and the like. The carbon aerogels may also find applications in, for example, elastic conductors, electrodes, flexible displays, loudspeakers, sensors, nanoelectronics, energy harvesting devices, organic photovoltaic devices, light emitting diodes, dampers (for example, for mechanical applications, impact protection, and packaging), mechanical structures, shock absorbers, coatings, small electrochemical double layer supercapacitors, chemical adsorber for cleaning up spills, thermal insulation, water purification, solar energy collectors, and the like.

EXAMPLE

Example 1

Preparation of a Carbon Aero Gel from Whole Wheat Flour

A homogeneous slurry was prepared by mixing about 5 grams of whole wheat flour with 10 mL water. The slurry was heated in a microwave oven (800 W) for 8 minutes. The carbon aerogel formed was further heated on an open electric heater for 3 minutes. The carbon aerogel obtained had the following characteristics: weight=0.5386 grams; bulk volume=4.21 $cm^3$; material volume=3.11 $cm^3$; density=0.12 grams/cubic centimeter; pore volume=1.1 $cm^3$; porosity=2.04 $cm^3$/gram; surface area=3060 $m^2$/gram. The carbon aerogel displayed good strength as 1 gram of carbon aerogel withstood a load of 1200 grams. The carbon aerogel further exhibited good electrical conductivity ($2 \times 10^{-7}$ seimens).

The density of the carbon aerogel was determined as follows: A regular shaped carbon aerogel was cut from the initial material, and the weight of the cubic carbon aerogel was measured. The volume of the material was determined by multiplying the length, breadth, and height of the cubic aerogel. The weight of the aerogel was divided by the total volume to obtain the density (grams/cubic centimeter).

The pore volume and porosity were calculated as follows: the bulk volume of the aerogel was calculated, and then the material volume was measured by grinding the aerogel thoroughly with no pores. The pore volume was the difference between the bulk volume and the material volume (pore volume=bulk volume−material volume). Porosity=Pore volume of the sample/sample weight.

Example 2

Preparation of a Carbon Aerogel from Whole Wheat Flour

A homogeneous slurry was prepared by mixing about 5 grams of whole wheat flour was mixed with 5 mL water. The slurry was heated in a microwave oven (800 W) for 8 minutes. The carbon aerogel formed was further heated on an open electric heater for 3 minutes. The carbon aerogel obtained had the following characteristics: weight=0.62 grams; bulk volume=2.48 $cm^3$; material volume=1.65 $cm^3$; pore volume=0.83 $cm^3$; porosity=1.33 $cm^3$/gram; surface area=2000 $m^2$/gram. The carbon aerogel displayed good electrical conductivity ($10^{-6}$ seimens) and strength (1 gram of carbon aerogel withstood a load of 1500 grams).

Example 3

Preparation of a Carbon Aerogel from Whole Wheat Flour

A homogeneous slurry was prepared by mixing about 5 grams of whole wheat flour was mixed with 10 mL water. The slurry was heated in a microwave oven (800 W) for 5 minutes. The carbon aerogel formed was further heated on an open electric heater for 3 minutes. The carbon aerogel obtained had the following characteristics: weight=0.54 grams; bulk volume=4 $cm^3$; material volume=3.23 $cm^3$; density=0.13 grams/cubic centimeter; pore volume=0.77 $cm^3$; porosity=1.42 $cm^3$/gram; surface area=2180 $m^2$/gram. The carbon aerogel displayed good electrical conductivity ($2 \times 10^{-7}$ seimens) and strength (1 gram of carbon aerogel withstood a load of 1500 grams).

Example 4

Preparation of a Carbon Aerogel from Refined Wheat Flour

A homogeneous slurry was prepared by mixing about 5 grams of refined wheat flour was mixed with 10 mL water. The slurry was heated in a microwave oven (800 W) for 10 minutes. The carbon aerogel formed was further heated on an open electric heater for 3 minutes. The carbon aerogel obtained had the following characteristics: weight=0.26 grams; bulk volume=4.1 $cm^3$; material volume=3.05 $cm^3$; density=0.11 grams/cubic centimeter; pore volume=1.05 $cm^3$; porosity=4.03 $cm^3$/gram; surface area=6057 $m^2$/gram. The carbon aerogel displayed good electrical conductivity ($2 \times 10^{-7}$ seimens) and strength (1 gram of carbon aerogel withstood a load of 500 grams).

Example 5

Preparation of a Carbon Aerogel from a Mixture of Whole Wheat Flour and Refined Wheat Flour A homogeneous slurry was prepared by mixing about 2.5 grams of whole wheat flour and 2.5 grams of refined wheat flour (contains no cellulose fibers) in 10 mL water. The slurry was heated in a microwave oven (800 W) for 8 minutes. The carbon aerogel formed was further heated on an open electric heater for 3 minutes. The carbon aerogel obtained had the following characteristics: weight=0.24 grams; bulk volume=1.67 $cm^3$; material volume=0.87 $cm^3$; density=0.14 grams/cubic centimeter; pore volume=0.8 $cm^3$; porosity=3.33 $cm^3$/gram; surface area=5000 $m^2$/gram. The carbon aerogel displayed good electrical conductivity ($2 \times 10^{-7}$ seimens) and strength (1 gram of carbon aerogel withstood a load of 700 grams).

Example 6

Preparation of a Carbon Aerogel from a Mixture of Whole Wheat Flour and Potato Starch A homogeneous slurry was prepared by mixing about 5 grams of whole wheat flour and 1 gram of potato starch in 10 mL water. The slurry was heated in a microwave oven (800 W) for 8 minutes. The carbon aerogel formed was further heated on an open electric heater for 3 minutes. The carbon aerogel obtained had the following characteristics: weight=0.23 grams; bulk volume=1.64 cm$^3$; material volume=0.85 cm$^3$; density=0.14 grams/cubic centimeter; pore volume=1.09 cm$^3$; porosity=4.74 cm$^3$/gram; surface area=7110 m$^2$/gram. The carbon aerogel displayed good electrical conductivity (2×10$^{-7}$ seimens).

Example 7

Preparation of a Carbon Aerogel from a Mixture of Whole Wheat Flour and Potato Starch A homogeneous slurry was prepared by mixing about 4.5 grams of whole wheat flour and 500 milligrams of potato starch in 10 mL water. The slurry was heated in a microwave oven (800 W) for 10 minutes. The carbon aerogel formed was further heated on an open electric heater for 3 minutes. The carbon aerogel obtained had the following characteristics: weight=0.22 grams; bulk volume=2.56 cm$^3$; material volume=1.82 cm$^3$; density=0.06 grams/cubic centimeter; pore volume=0.74 cm$^3$; porosity=3.36 cm$^3$/gram; surface area=5000 m$^2$/gram. The carbon aerogel displayed good electrical conductivity (2×10$^{-7}$ seimens).

Example 8

Determination of Strength of Carbon Aerogel

Figure 4:
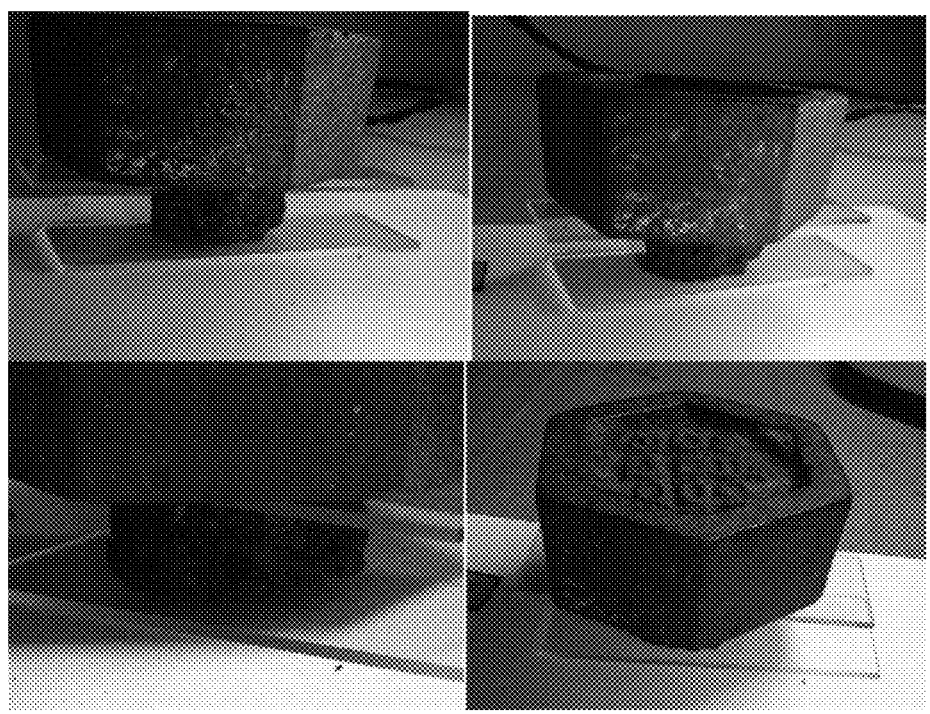
FIG. 4 demonstrates the strength of various carbon aerogels prepared according to embodiments set forth in Examples 1-7.

Carbon aerogels prepared in Examples 1-7 were cut in to regular cubic shapes, and weighed. About 0.5 gram of the aerogel was kept between two glass slides, and iron blocks of different weights were placed on the top and the load bearing strength was measured. On average, carbon aerogels synthesized by the methods as described herein could bear 500-1500 times load of its own weight (FIG. 4).

Example 9

Use of Carbon Aerogels as an Electrical Insulators

Carbon aerogels prepared in Examples 1-7 are applied between electrical coils as insulators. The aerogels exhibited excellent electrical resistivity, and are resistant to high temperatures. These coils are used in electrical transformers.

Example 10

Use of Carbon Aerogels in Batteries

Carbon aerogels of Examples 1-7 can be combined with metal oxide nanoparticles (for example, TiO$_2$) via the vacuum filtration or the layer-by-layer method for lithium-ion battery negative electrodes. In this composite electrode system, the carbon aerogels not only can mechanically support metal oxide particles, but also can increase the power density of the metal oxide particles by providing an interconnected conducting carbon framework.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of making a carbon aerogel from a biomass, the method comprising:
   dielectrically heating a biomass slurry to produce the carbon aerogel, wherein the biomass slurry comprises the biomass and water, wherein the carbon aerogel has a density of about 0.05 gram/cubic centimeter to about 0.2 gram/cubic centimeter.

2. The method of claim 1, further comprising heating the carbon aerogel to produce an electrically conducting carbon aerogel.

3. The method of claim 2, wherein heating the carbon aerogel induces unidirectional electrical conductivity in the carbon aerogel.

4. The method of claim 2, wherein heating the carbon aerogel step is performed for about 10 seconds to about 60 minutes.

5. The method of claim 2, wherein heating the carbon aerogel step is performed using a hot plate, an oven, a heater, a griller, a furnace, hot air, or any combination thereof.

6. The method of claim 1, wherein the carbon aerogel has a porosity of about 0.5 cubic centimeter/gram to about 5 cubic centimeter/gram.

7. The method of claim 1, wherein the carbon aerogel has a surface area of about 1000 $m^2$/gram to about 5000 $m^2$/gram.

8. The method of claim 1, wherein dielectrically heating the biomass slurry comprises dielectrically heating a slurry of a carbohydrate, gluten, wheat flour, rice flour, baking flour, whole grain flour, oat flour, rye flour, sorghum flour, millet flour, or any combination thereof.

9. The method of claim 1, wherein dielectrically heating comprises heating by a radio frequency energy having a frequency of about 3 KHz to about 300 GHz for about 10 seconds to about 60 minutes.

10. The method of claim 1, wherein the carbon aerogel has a yield strength equal to or greater than about 1 MPa.

* * * * *